April 11, 1961  W. P. OEHLER ET AL  2,979,136
PLANTERS
Filed Oct. 31, 1957  4 Sheets-Sheet 4

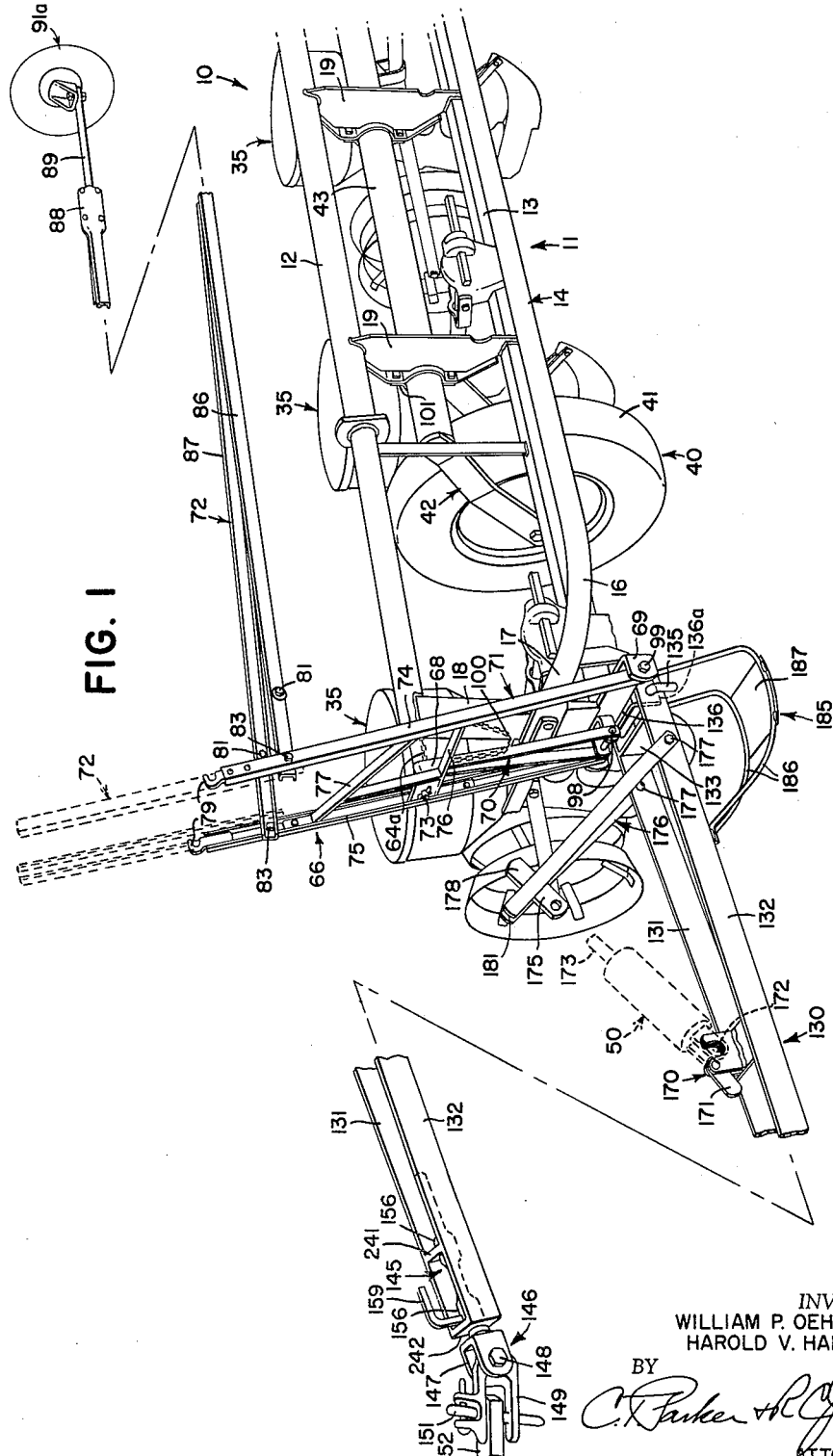

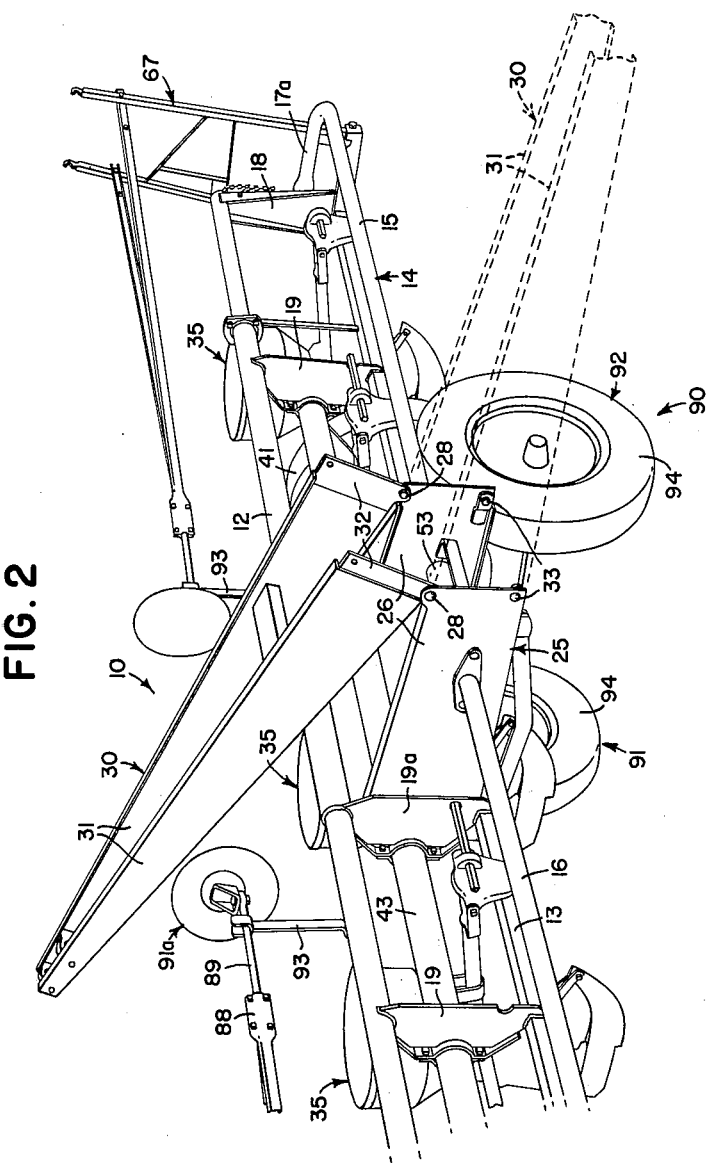

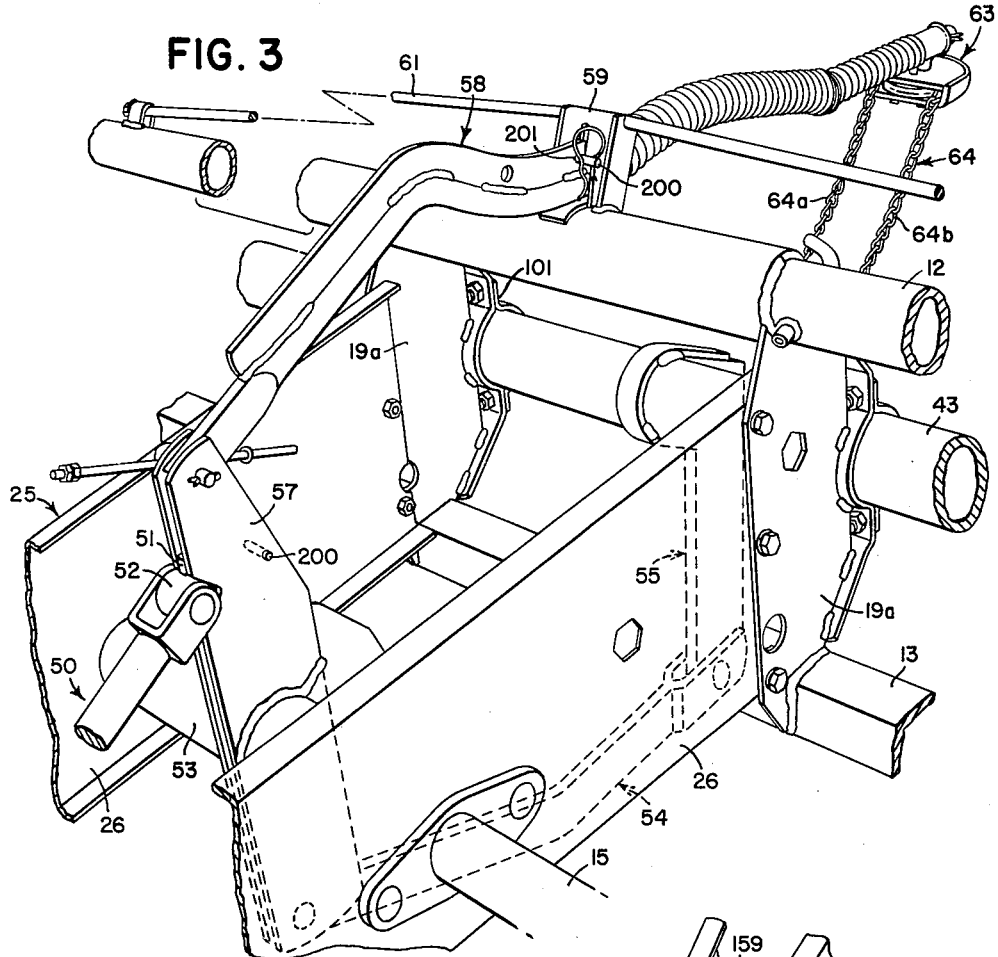
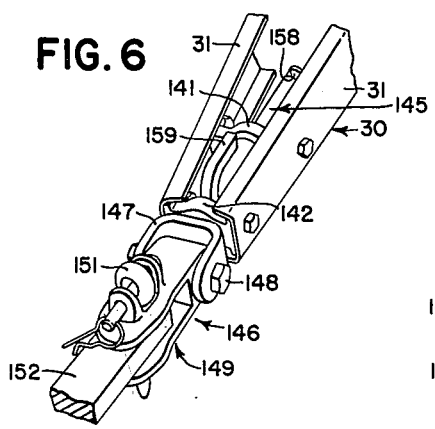
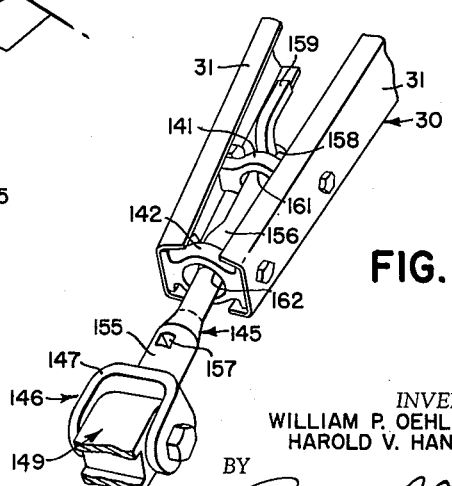

INVENTORS.
WILLIAM P. OEHLER
HAROLD V. HANSEN
BY
ATTORNEYS

United States Patent Office 2,979,136
Patented Apr. 11, 1961

2,979,136

PLANTERS

William P. Oehler, Moline, and Harold V. Hansen, Hillsdale, Ill., assignors, by mesne assignments, to Deere & Company, a corporation of Delaware Filed Oct. 31, 1957, Ser. No. 693,710

12 Claims. (Cl. 172—126)

The present invention relates generally to agricultural implements and more particularly to implements such as corn planters and the like, especially implements adapted for multi-row operation.

The object and general nature of the present invention is the provision of a new and improved six-row planter. More specifically, it is a feature of this invention to provide a relatively wide implement, such as a six-row planter, for example, with new and improved means making it possible to transport the implement, as from field to field, along highways and the like, in an endwise position, whereby the implement may be moved along narrow lanes, through relatively restricted spaces and the like.

Specifically, it is a feature of this invention to provide an implement of this kind with folding marker arms, so constructed and arranged that the outer parts thereof swing downwardly along the upper portion of the frame of the implement and into positions in which excessive heights of marker arm parts are avoided, and a further specific feature of this invention is the provision of quickly attachable transport wheel means and an associated power operated transport hitch that not only can readily be attached to one end of the implement frame but also operated during transport to raise or lower one or the other end of the implement so as to ensure that parts of the implement will not strike the ground when passing over uneven terrain during transport.

These and other objects and advantages of the present invention will be apparent to those skilled in the art after a consideration of the following detailed description, taken in conjunction with the accompanying drawings, in which:

Fig. 1 is a fragmentary perspective view of the right hand portion of a six-row corn planter in which the principles of the present invention have been incorporated.

Fig. 2 is a similar perspective view showing the left hand portion of the implement, showing the transport wheels in their transport position.

Fig. 3 is a fragmentary enlarged perspective view of the planter ground wheel raising and lowering means, with associated marker operating means.

Fig. 6 is a fragmentary perspective view of the releasable hitch, showing the latter in its rigid position.

Fig. 7 is a view similar to Fig. 6, showing the hitch in its loosened position, serving to facilitate attachment of the planter to a propelling tractor.

Figure 5:
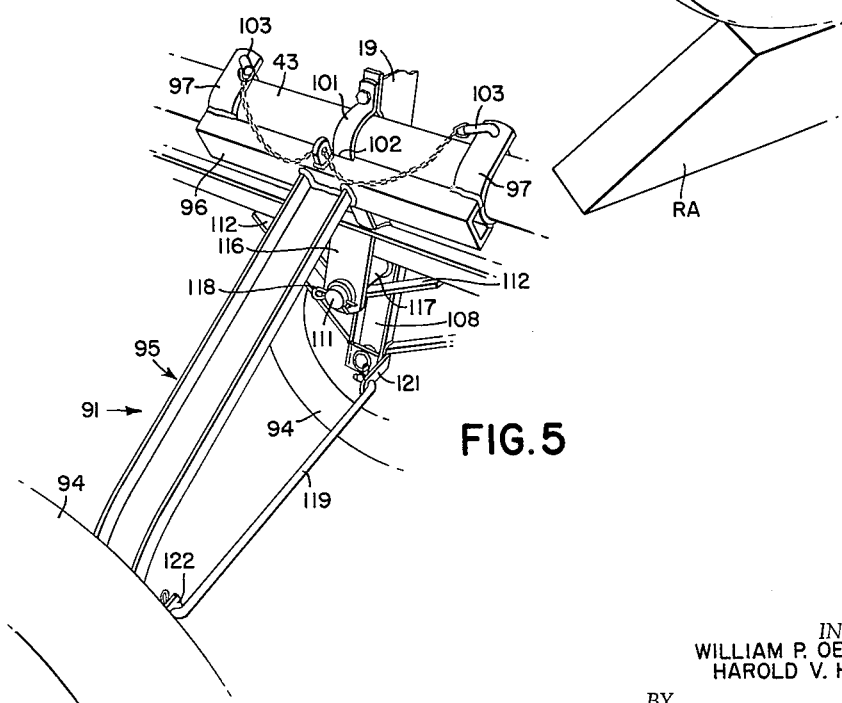
Fig. 5 is a fragmentary perspective view of the transport wheel that is attached to the other side of the planter frame when the planter is to be transported endwise.

Referring first to Figs. 1 and 2, the present invention has been shown by way of illustration as incorporated in a six-row planter. As will readily be understood, this implement is of considerable width. The planter, which is indicated in its entirety by the reference numeral 10, comprises an elongated frame 11 that is made up of an upper sill member 12, preferably in the form of a pipe, a lower sill member 13, preferably in the form of an angle, and a forward frame member 14 that preferably is in the form of two pipe sections 15 and 16 suitably connected together, as will be described below, at the inner ends and at the outer ends formed with rearwardly bent sections 17 and 17a that are connected to laterally outer end members 18 that form a part of the frame 11. The end members 18 are disposed in generally vertical position and are secured, as by welding, to the outer ends of the upper and lower sill members 12 and 13. The latter members are also interconnected by intermediate vertical members indicated generally at 19. These members are also welded or otherwise rigidly secured to the associated upper and lower frame members 12 and 13. A draft frame structure, indicated generally by the reference numeral 25, is also connected to and generally forms a part of the main frame 11. The draft structure 25 comprises rearward generally vertically disposed plate sections 26 that are rigidly secured in any suitable way at their rear ends to the centrally disposed vertical frame members 19a (Figs. 2 and 5). Pivotally secured, as at 28, to the draft frame members 26 is a folding hitch frame 30 that is made up of a pair of forwardly converging plate sections 31 having apertured portions 32 that are adapted to overlap the forward ends of the plate sections 26. In Fig. 2 the hitch member 30 is shown in a transport or rearwardly folded position, but the latter may be swung downwardly and forwardly into its operating or planting position, as indicated in dotted lines in Fig. 2, after which connecting pins 33 may be inserted to hold the hitch structure 30 in planting position. In its transport position, as shown in full lines in Fig. 2, the hitch structure 30 rests against the truss rod, referred to in detail below, that forms a part of the upper sill pipe 12.

The planter 10 shown in Figs. 1 and 2 is provided with a plurality of planting units, each indicated by the reference numeral 35. Each of these units 35 is connected with the associated planter frame 11 by generally parallel link means, but since the present invention is not particularly concerned with the details per se of the planting units 35, they need not be described further. The planter, in its planting position, is raised and lowered into and out of position by a ground wheel unit indicated in its entirety by the reference numeral 40. This unit comprises a pair of ground wheels 41 journaled on the lower or rear ends of wheel arms 42 that are secured, as by welding or the like, to the ends of a rockshaft 43 rockably mounted in any suitable way in the planter frame 11. The rockshaft 43 of the ground wheel unit 40 preferably is operated by a power cylinder indicated in its entirety in Fig. 3 by the reference numeral 50. The power unit preferably is in the form of a hydraulic ram connected at its rear end as at 52 with a lever 51 swingably mounted on a sleeve 53 that is disposed between the two plate sections 26 of the draft hitch. The lever or arm 51 is disposed between two bars 57 forming a lever, the lower end of which is connected by a link 54, with an arm 55 that is fixed, as by welding, to the generally central portion of the ground wheel rockshaft 43. Thus, extension and retraction of the ram unit 50 acts to rock the rockshaft 43 in the planter frame and thus raise and lower the latter relative to the ground wheels 41. Also connected to the upper ends of the bars 57 is a marker-actuating push rod 58 that passes through a guide 59 fixed to the generally central portion of the upper sill pipe 12. The guide 59 also serves as a strut cooperating with a tie rod 61 that extends from the strut 59 to outer portions of the top sill member 12 laterally outwardly (Fig. 1) of the central part of the sill member 12 to reenforce the latter. A sheave unit 63 is carried at the rear end of the push rod 58 and receives a marker lifting chain 64, the two sections 64a and 64b of which extend over sheaves (not shown) and laterally outwardly along the inside of the pipe member 12 and guidingly through the upper end 68 (Fig. 1) of a strut 70, to be described below, to points of connection 73 with the associated marker arms 66 and 67.

Each of the marker arms 66 and 67 is swingably connected to the associated end of the frame 11, as by a bracket 69 fixed to the lower end of the associated frame member 18, and since the marker arms are identical a description of one will suffice.

Each marker arm includes an inner section 71 and an outer section 72 pivotally interconnected, as at 83. Each inner section 71 comprises a truss-like part including front and rear legs 74 and 75 suitably interconnected by means of a cross bar 76 and a diagonal brace bar 77. The outer ends of the legs 74 and 75 extend beyond the pivots 83 and are formed with hook sections 79 that are adapted to detachably receive connecting means in the form of bolts or the like as shown at 81. The outer marker arm section 72 includes two leg sections 86 and 87 that are apertured to receive the pivot bolts 83. The sections 86 and 87 carry the attaching bolts 81, and at their upper or outer ends the sections 86 and 87 are connected together, as at 88, and adjustably receive the shank 89 of an associated disk marking unit 91a.

In normal operation, the two marker parts 71 and 72 are connected together in extending relation, with the attaching bolts 81 disposed in the hook sections 79 and tightened to secure the marker parts in rigid relation. When the ground wheels 41 are raised to lower the planting units into operating position, the marker arms 66 and 67 are lowered so as to extend from one end of the frame a distance approximately equal to the width of three or three and a half rows so as to make a mark in the ground along which the outfit, after it has been turned around at the end of the field, may follow on the next round. Whenever the implement has reached the end of the field, the power unit 50 is operated to raise the frame relative to the ground wheels and thus lift the planting units out of engagement with the ground. This action also results in raising the down marker arm into its raised position, and during this action the strut 70 facilitates the lifting of the down marker arm. As will be seen from Fig. 1, the lower end of the strut 70 is pivoted at 98 to a bracket mounted in line with the marker arm pivots 99. A chain 100 is connected between the adjacent portion of the planter frame end member 18 and the upper part of the strut 70 and, as can be seen from Fig. 1, the length of the chain 100 is such that the strut may swing downwardly only about half way when the associated marker arm is lowered all the way to the ground. Since the upper end of the strut 70 carries the lift chain 64a (Fig. 1), the strut thus acts in the nature of a jib to increase the mechanical advantage at which the chain 64a acts when the marker arm is in its lowermost position.

As will readily be apparent from Figs. 1 and 2, a six-row implement of the type just described is an implement that is quite wide, and while the latter may be raised on its ground wheels 41 so as to provide for turning at the ends of the field or for transport along lines of travel where the width of the implement is not a restriction, there are many places where the implement may not readily be transportable on its own wheels 41 due to the width of the implement. Accordingly, the present invention contemplates new and improved means whereby the implement may readily be arranged for transport endwise, in which arrangement the width of the implement during transport is not substantially greater than the width of the conventional farm tractor. Briefly, to provide for such endwise transport all that it is necessary to do is to provide auxiliary transport wheels, swing the hitch frame over onto the main frame of the implement, attach a transport hitch unit to one end of the implement frame, and then hitch the tractor to the transport hitch. This arrangement will now be described.

Figure 4:
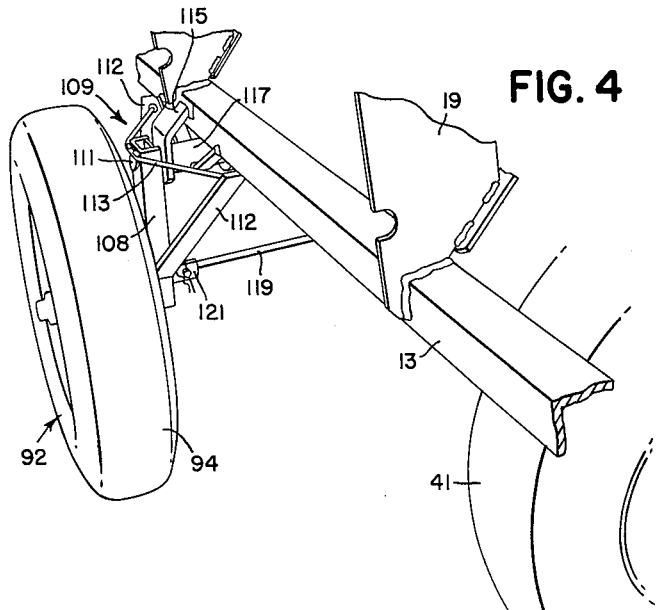
Fig. 4 is a fragmentary perspective view of the transport wheel mounting means that is attached to one side of the planter frame when the planter is to be transported endwise.

The auxiliary transport wheels and associated parts are best shown in Figs. 2, 4 and 5. The transport wheel means, indicated in its entirety by the reference numeral 90, comprises, generally speaking, a right hand transport unit 91 and a left hand transport unit 92. The right hand transport unit 91 (Fig. 5) includes a transport wheel 94 journaled on the lower end of a standard 95, preferably in the form of a channel, to the upper end of which a cross piece 96 is fixed, as by welding. At the ends of the cross piece 96 U-shaped yokes 97 are fixed, each yoke being shaped so as to snugly embrace the adjacent portion of the rockshaft 43, preferably on opposite sides of the strap 101 that rockably connects the rockshaft 43 with the adjacent intermediate vertical plate 19. A slot 102 is formed in at least one of the flanges of the cross arm 96 and cooperates with the strap 101 to prevent axial shifting of the transport wheel standard. Pins 103 extend through openings in the ends of the yokes 97 for releasably holding the standard 95 to the rockshaft 43.

The left hand transport wheel unit 92 (Fig. 4) includes a transport wheel 94 journaled at the lower end of a vertical standard 108, also of channel material, the standard 108 forming a portion of an attaching structure 109 that also includes a stub shaft 111 and associated braces 112, all securely welded or otherwise rigidly fixed to one another. To receive the auxiliary transport wheel unit 92, the frame of the implement carries a pair of brackets 115 and 116 apertured to receive a sleeve member 117 adapted to fit over the stub shaft 111. The sleeve 117 is fixed, as by welding, to one of the brackets 115 and 116, and a quick releasable pin 118 is extended through an opening in the inner end of the stub shaft 111 to releasably hold the transport wheel unit 91 (Fig. 5) in position. Fore-and-aft oscillation of the standard 108 relative to the implement frame is prevented by virtue of the upper ends of the brackets 112 contacting adjacent portions of the front sill angle 13. A tie rod 119 is connected between the two transport wheel units, the tie rod 119 including laterally turned ends extending through apertured plates 121 and 122 carried by the lower end of channel 108 and the lower end of the channel 95.

The transport hitch is indicated in its entirety by the reference numeral 130 and comprises a pair of interconnected bars 131 and 132 spaced apart at their inner ends by an interconnecting brace 133, as best shown in Fig. 1. The inner ends of the bars 131 and 132 are apertured to receive quick attachable pins 135 by which the transport hitch is connected for vertical swinging movement to the depending ends 136a of the generally U-shaped bracket 136 that is attached at its middle portion to the lower end of the end frame member 18 at the right end of the implement frame 11 through the associated bracket 69 to which the bracket 136 is welded.

The front or outer ends of the main hitch bars 31 (Figs. 6 and 7) are interconnected by apertured cross pieces 141 and 142, and the outer ends of the transport hitch bars 131 and 132 are interconnected by apertured cross pieces 241 and 242, both hitches being thereby adapted to receive the tractor-carried shank 145 of a hitch clevis unit 146. The latter includes a U-shaped clevis 147 fixed to the outer or forward end of the shank 145 and apertured to receive a pin 148 by which a forward clevis 149 is swingably connected with a clevis 147 for generally vertical swinging. The clevis 149 carries a hitch pin 151 that is adapted to detachably connect the hitch clevis unit 146 to the drawbar 152 of a conventional farm tractor.

The shank 145 and the associated cross pieces 141 and 142, and 241 and 242, are especially constructed so as to provide for easy and convenient connection of the transport hitch to the drawbar 152 of the tractor. Referring again to Figs. 6 and 7, particularly the latter, it will be noted that the shank 145 is considerably longer than the fore-and-aft distance between the shank-receiving parts 141 and 142. Also, it will be noted that the shank includes two enlarged portions 155 and 156, the enlarged portion 155 being apertured, as at 157, and the rearmost portion of the shank 145 also being apertured, as at 158 (Fig. 6). Each of these apertures 157 and 158 is adapted to receive a detachable draft pin 159. Each of the parts 141 and 142 is provided with an aperture, as indicated at 161 and 162, that is dimensioned to snugly receive the enlarged portions 155 and 156 of the shank 145 when the latter is in a rearward position, as indicated in Fig. 6 and in the left hand portion of Fig. 1, but when the shank 145 is in a forward position as shown in Fig. 7, the shank 145 has considerable looseness within the openings 161 and 162. However, the shank 145 is held connected with the draft bars 31 and 32, or 131 and 132, by virtue of the disposition of the pin 159 in the rearmost opening 158. Thus, the tractor carrying the clevis unit 146 may be backed into close proximity to, but not necessarily aligned accurately with, the hitch frame, 30 or 130, and the shank 145 inserted loosely into the cross pieces 141 and 142, or 241 and 242, as the case may be. Then by backing the tractor slightly, the enlarged portions 155 and 156 are forced within and snugly fit the openings 161 and 162 in the cross pieces. This snugly interconnects the shank 145 with the forward end of the associated hitch frame. Then by inserting the pin 159 behind the part 142 or 242 and into the opening 157, the shank 145 is rigidly connected to the forward end of the hitch frame. If desired, two shank parts 145 may be provided, one for the main hitch unit 30 and one for the transport unit 130, in which the tractor may be connected and disconnected by use of the pin 151. In either case, the loose association of the shank 145 and associated hitch frame, as illustrated in Fig. 7, accommodates some misalignment without interfering with ready connection of the tractor with the implement.

The transport hitch unit 130 includes means receiving the remote cylinder unit 50 that normally forms a part of the tractor, and is best shown in Fig. 1. Such cylinder-receiving means includes a bracket 170 attached to the transport hitch bars 131 and 132, the bracket 170 carrying a pivoted detent 171 which releasably holds the pin 172 of the associated ram unit or remote cylinder 50 in place in the bracket 170. The piston rod 173 of the unit 50 is detachably connected to a lug 175 formed on a swinging arm structure 176, the latter being pivoted, as at 177, to the transport hitch bars 131 and 132. A second lug 178 is carried on the swinging end of the cylinder support 176 and is adapted to engage the adjacent end frame member 18 when the cylinder is extended, and the swinging arm 176 is extended outwardly, as at 181, to provide means that is engageable with the cross bar 76 of the marker arm associated therewith so that when the cylinder is operated and the lug 178 comes up against the end frame member 18, the portion 181 holds the marker arm against the end of the frame, thereby preventing the marker arm from falling out of its transport position, even if the outer marker arm section 72 should not, for some reason, be disposed in its folded position as shown in Figs. 1 and 2. The inner ends of the transport hitch bars 131 and 132 (Fig. 1) carry a ground engaging shoe member 185 that is made up of shaped rod members 186 and a ground engaging plate 187, the latter being welded to the U-shaped rod members 186 and the rod members being welded to the hitch bars 131 and 132.

The operation of the implement as so far described is substantially as follows.

When it is desired to move the planter through gates, along highways and the like, it may be desirable, if not absolutely necessary, to transport the machine in an endwise position. To arrange for endwise transport, the planter is first raised into its normal transport position by operating the power cylinder 50 to force the ground wheels 41 into their lowermost position relative to the frame, thus raising the latter. Next the planter is driven onto a ramp which is preferably placed so as to receive the left hand ground wheel, and when the left hand ground wheel is centered on top of the ramp, which is indicated by the reference character RA (Fig. 4), the brakes of the tractor are set so as to hold the planter against movement out of a desired position. Next, the transport wheel units 91 and 92 are attached to the planter frame in the positions shown in Figs. 4 and 5, and then the tie link 119 connected to the two transport wheel units, making sure that the slot 102 in the cross arm 96 is engaged with the strap 101, as shown in Fig. 5. The bolts 81 are then loosened (dotted line position of the marker arms), Fig. 1, and next the outer marker arm sections 72 are folded downwardly over onto the planter frame, the outer ends of the marker arms resting in the supports 93. Next, the transport hitch unit 130 is attached to the bracket 136 on the right end of the planter frame, generally opposite the end portion to which the transport wheel units 91 and 92 are connected. From Fig. 1 it will be observed that the shoe portion 185 is disposed substantially directly underneath the pivot established by the pins 135. The tractor power lift is then operated to extend the cylinder 50 so as to raise the planter wheels 41, the marker arms being held up in elevated position by a suitable means, such as by connecting a portion of the outer ends of the chains 64a and 64b to the adjacent portion of the planter frame. This serves to lower the planter down onto the transport wheels 94 and onto the shoe 187. Since the planter wheels 41 are raised, it is now possible to remove the ramp RA. Preparatory to removing the cylinder 50 from the planter frame it is necessary to hold the planter wheels 41 in a raised position. To this end, a pin 200 is inserted into an opening 201 in the push rod 58. The opening 201 lies just in front of the guide 59 whereby the abutment of the pin 200 against the guide 59 prevents the wheels 41 from moving downwardly. Preferably, the pin 200 is the same pin that normally locks the arm 51 to the bars 57, as shown in dotted lines in Fig. 3. Since the pin 200 now holds the planter wheels 41 in an elevated position, the cylinder 50 may now be removed and also the hitch clevis pin 159 is removed from the shank 145 and the clevis structure 146 may now be disconnected entirely from the draft frame 30. The forward section of the draft frame may then be folded back onto the planter frame into the position shown in full lines in Fig. 2, which appreciably narrows the planter for endwise transport.

The tractor is then driven around into position in front of the transport hitch 130 and backed into a position to permit the shank 145 to be inserted into the front end of the transport hitch 130. The front end of the hitch 130 includes a pair of apertured parts 241 and 242 that are shaped substantially exactly like the parts 141 and 142 described above. If the tractor is not exactly lined up with the transport hitch, the shank 145 may nevertheless be readily inserted into the parts 241 and 242 since the openings therein are, like the openings in the parts 141 and 142, appreciably larger than the diameter of the pin, whereby there is considerable looseness between the clevis shank and the front end of the transport hitch. The tractor is then backed toward the transport hitch, which forces the shank 145 to move to its rearmost position in which it is rigidly interconnected with the hitch parts 241 and 242, after which the draft pin 159 is inserted into the forward opening 157 to complete the connection of the tractor with the transport hitch.

The cylinder 50 is then connected between the transport hitch 130 and the adjacent ends of the planter frame 11. To effect this connection, one end of the cylinder is connected with the bracket 170 and the other end is connected to the lug 175. The cylinder is then extended and the lug 178 is brought up against the adjacent part 18 of the planter frame, so that further extension of the ram unit then lifts the front portion of the frame off the shoe 187, whereby the planter, in its endwise transport position, is now supported on the transport wheels 94 and on the drawbar 152 of the tractor. The extension 181 of the swinging bar 176 acts against the cross bar 76 of the marker arm to hold the laterally inner swingable section 71 up against the adjacent end of the planter frame.

Not only does the cylinder 50 in the above-described transport arrangement act to support the front end of the planter frame on the drawbar of the tractor but, in addition, the cyclinder 50 may be extended or retracted slightly so as to rock the planter frame on its transport wheels 94, and thus facilitate the passage of the implement over abrupt rises in the ground surface or through swales that, without the provision of means for rocking the planter frame on its transport wheels, might result in some of the planter parts, such as the end planting units, digging into the ground.

While we have shown and described the preferred structure in which the principles of the present invention have been incorporated, it is to be understood that our invention is not to be limited to the particular means, shown and described above, but that, in fact, widely different means may be employed in the practice of the broader aspects of my invention.

What we claim, therefore, and desire to secure by Letters Patent is:

1. The combination with a tractor having power actuated means including a remote cylinder flexibly connected with the tractor, of a multi-row planter having an elongated frame normally disposed transversely with respect to the direction of travel during planting, shiftable ground wheels normally supporting said frame during planting, means connected with said frame and ground wheels for detachably receiving said remote cylinder, whereby extension and retraction of the latter acts to raise and lower the ground wheels with respect to said frame, and means providing for endwise travel of said frame for transport purposes, said means comprising transport wheel means detachably connectible with said frame when said cylinder has been operated to raise said frame on said ground wheels, a rigid transport hitch adapted to be detachably pivoted to said other end of said frame for generally vertical swinging relative thereto, and means on said hitch and said frame to receive said remote cylinder, whereby operation of the latter, when connected between said frame and transport hitch acts to raise and lower said other end of said frame relative to said transport wheel means.

2. The combination with a tractor having power actuated means including a remote cylinder flexibly connected with the tractor, of a multi-row planter having an elongated frame normally disposed transversely with respect to the direction of travel during planting, shiftable ground wheels normally supporting said frame during planting, means connected with said frame and ground wheels for detachably receiving said remote cylinder, whereby extension and retraction of the latter acts to raise and lower the ground wheels with respect to said frame, means providing for endwise travel of said frame for transport purposes, said means comprising transport wheel means detachably connectible with said frame closer to one end of said frame than the other end when said cylinder has been operated to raise said frame on said ground wheels, a rigid transport hitch adapted to be detachably pivoted to said other end of said frame for generally vertical swinging relative thereto, means on said hitch and said frame to receive said remote cylinder, whereby operation of the latter, when connected between said frame and transport hitch, acts to raise and lower said other end of said frame relative to said transport wheel means, a marker arm pivoted to said other end of said frame and adapted to be shifted relative to said frame into a transport position, and means connected with said remote cylinder to be actuated thereby when the latter is connected between said transport hitch and said frame for holding said marker arm in its transport position.

3. The combination with a tractor having power actuated means including a remote cylinder flexibly connected with the tractor, of a multi-row planter having an elongated frame normally disposed transversely with respect to the direction of travel during planting, shiftable ground wheels normally supporting said frame during planting, means connected with said frame and ground wheels for detachably receiving said remote cylinder, whereby extension and retraction of the latter acts to raise and lower the ground wheels with respect to said frame, means connected with said cylinder receiving means for releasably holding said ground wheels in a lowered position relative to the planter frame, thereby accommodating removal of said cylinder from the planter frame, and means providing for endwise travel of said frame for transport purposes, said means comprising transport wheel means detachably connectible with said frame closer to one end of said frame than the other end when said cylinder has been operated to raise said frame on said ground wheels, a rigid transport hitch adapted to be detachably pivoted to said other end of said frame for generally vertical swinging relative thereto and having a ground engaging portion adjacent said other end of said elongated frame adapted to support said other end of the frame when the latter is lowered onto said transport wheel means, and means on said hitch and said frame to receive said remote cylinder, whereby operation of the latter, when connected between said frame and transport hitch acts to raise and lower said other end of said frame relative to said transport wheel means.

4. The combination with a tractor having power actuated means including a remote cylinder flexibly connected with the tractor, of a multi-row planter having an elongated frame normally disposed transversely with respect to the direction of travel during planting, shiftable ground wheels normally supporting said frame during planting, means connected with said frame and ground wheels for detachably receiving said remote cylinder, whereby extension and retraction of the latter acts to raise and lower the ground wheels with respect to said frame, ground supported ramp means arranged to receive the ground wheel adjacent one end of said frame, so that by moving the planter up onto said ramp means said one end of the planter frame is disposed at a relatively high position, auxiliary transport wheel means attachable to the planter frame, when said one end of the latter is supported on said ramp means, in a position to support the planter frame with the ground wheels above the ground after the ground wheels have been raised to impose at least a part of the weight of the planter on the transport wheel means and the removal of the planter from said ramp means, a rigid hitch member pivotally connected with the other end of said frame, and means on the latter and said rigid hitch member for swinging the latter in a direction to raise said other end of the frame.

5. In a planter, an elongated frame adapted for multi-row use, ground wheels adapted normally to support said frame in transverse position relative to the direction of travel during the planting operation, said ground wheels being disposed generally adjacent the end portions, respectively, of said frame, ground supported ramp means arranged to receive the ground wheel adjacent one end of said frame, auxiliary transport wheel means attachable to the planter frame adjacent said one end thereof, when the planter frame is on said ramp means in a position to support said one end of the frame with the associated ground wheel out of contact with the ground after the ground wheels have been raised to impose at least a part of the weight of the planter on the transport wheel means and the removal of the planter from said ramp means, a transport hitch adapted to be connected at its outer end to a tractor and connected at its inner end to the other end of said frame, and means connected between said hitch and said other end of the planter frame so as to impose the weight of said other end of the planter frame onto the tractor through said hitch.

6. In a planter, an elongated frame means, a marker arm pivoted on one end of the frame means and swingable relative thereto into a transport position, a transport hitch also pivoted to said one end of said frame means, and means connected with said hitch and engageable with said marker arm to hold the latter in its transport position.

7. In a planter, frame means, a marker arm pivoted on the frame means and swingable relative thereto into a transport position, a strut pivoted to said frame adjacent the pivot of said marker arm, flexible means movable relative to said frame and extending across and reacting against said strut, means connecting the outer end of said flexible means beyond said strut with said marker arm, and means connected with the inner portion of said flexible means laterally inwardly of said strut for raising said marker arm.

8. In a planter, frame means, a marker arm pivoted on the frame means and swingable relative thereto into a transport position, a strut pivoted to said frame adjacent said marker arm, flexible means movable relative to said frame and extending across and reacting against said strut, said flexible means extending beyond said strut and connected with said marker arm, said flexible means extending laterally beyond said strut, means connected with the laterally inner portion of said flexible means for raising said marker arm, and means limiting the outward pivotal movement of said strut to a position extending outwardly and upwardly from the end of said frame means.

9. In an implement, an elongated frame adapted for multi-row use, ground wheels adapted normally to support said frame in transverse position relative to the direction of travel, auxiliary transport means, means to connect the auxiliary transport means to said elongated frame for endwise movement with said ground wheels out of contact with the ground, a transport hitch pivotally connected to one end of said frame and having tractor-receiving means at its outer end, and power operated means connected between said frame and said transport hitch for swinging the latter to shift the position of said frame on said transport means, said transport wheel means comprising a first wheel standard, a transport wheel journaled on the lower end thereof, a transverse sleeve fixed to said implement frame, means on said first standard insertable in said sleeve to hold said first standard against lateral displacement relative to the implement frame, a second wheel standard, a transport wheel journaled on the lower portion of said second standard, means separately connecting the second wheel standard to said frame, and a tie rod interconnecting the lower portions of said standards whereby said sleeve serves to hold said second standard against lateral displacement.

10. The invention set forth in claim 9, further characterized by said second wheel standard including a pair of frame-embracing yokes and a cross piece carrying said yokes, and means acting between said frame and cross piece to hold the latter against displacement along the frame.

11. The combination with a tractor having power actuated means including a remote cylinder flexibly connected with the tractor, of a multi-row planter having an elongated frame normally disposed transversely with respect to the direction of travel during planting, shiftable ground wheels normally supporting said frame during planting, means connected with said frame and ground wheels for detachably receiving said remote cylinder, whereby extension and retraction of the latter acts to raise and lower the frame while supported on the ground wheels, transport wheel means detachably connectible with said frame when said cylinder has been operated to raise said frame on said ground wheels, a rigid transport hitch adapted to be detachably pivoted to one end of said frame for generally vertical swinging relative thereto and including a ground-engaging shoe member disposed adjacent the pivotal connection between the transport hitch and said planter frame and adapted to cooperate with said transport wheel means to support said one end of the frame when the ground wheels are raised relative to said frame, means to lock said wheels in their raised position to accommodate removal of the remote cylinder from said frame, and means on said transport hitch and said frame to receive said remote cylinder, whereby operation of the latter, when connected between said frame and transport hitch acts to raise and lower said one end of said frame relative to said transport wheel means.

12. In an implement, an elongated frame adapted for multi-row use, ground wheels adapted normally to support said frame in transverse position relative to the direction of travel, detachable power means releasably connected between said frame and ground wheels for raising and lowering the frame relative thereto, auxiliary transport means, means to connect the auxiliary transport means to said elongated frame for endwise movement with said ground wheels out of contact with the ground, a transport hitch pivotally connected to one end of said frame and having tractor-receiving means at its outer end, means locking the ground wheels in a raised position relative to the frame when the latter is supported on said auxiliary transport means, and means to connect said power means between said transport hitch and said frame for rocking the latter on said auxiliary transport means.

References Cited in the file of this patent

UNITED STATES PATENTS

| | | |
|---|---|---|
| 704,791 | Glosser | July 15, 1902 |
| 958,567 | Ulrich | May 17, 1910 |
| 1,722,585 | Manley | July 30, 1929 |
| 1,805,505 | White | May 19, 1931 |
| 1,911,218 | White | May 30, 1933 |
| 1,941,539 | Court et al. | Jan. 2, 1934 |
| 2,175,282 | Cormany | Oct. 10, 1939 |
| 2,483,011 | Hudson | Sept. 27, 1949 |
| 2,670,672 | Markel | Mar. 2, 1954 |
| 2,729,157 | Webb | Jan. 3, 1956 |
| 2,736,567 | McMurray | Feb. 28, 1956 |
| 2,748,686 | Nelson | June 5, 1956 |
| 2,778,290 | Geeson et al. | Jan. 22, 1957 |
| 2,795,180 | Christofferson | June 11, 1957 |
| 2,806,707 | Christie | Sept. 17, 1957 |